US008955829B2

(12) United States Patent
Chen et al.

(10) Patent No.: US 8,955,829 B2
(45) Date of Patent: Feb. 17, 2015

(54) SIMPLE STARTUP CARBURETOR

(71) Applicant: Qian Chen, Ruian (CN)

(72) Inventors: Qian Chen, Ruian (CN); Yongcheng Jia, Ruian (CN)

(73) Assignee: Qian Chen, Ruian (CN)

( * ) Notice: Subject to any disclaimer, the term of this patent is extended or adjusted under 35 U.S.C. 154(b) by 169 days.

(21) Appl. No.: 13/722,177

(22) Filed: Dec. 20, 2012

(65) Prior Publication Data

US 2014/0084493 A1 Mar. 27, 2014

(30) Foreign Application Priority Data

Sep. 25, 2012 (CN) .......................... 2012 1 0360338

(51) Int. Cl.

| | |
|---|---|
| ***B01D 47/00*** | (2006.01) |
| ***F02M 37/00*** | (2006.01) |
| ***F02M 69/02*** | (2006.01) |
| ***F02M 9/12*** | (2006.01) |
| ***F02M 1/16*** | (2006.01) |
| ***F02M 1/18*** | (2006.01) |

(52) U.S. Cl.

CPC . *F02M 9/12* (2013.01); *F02M 1/16* (2013.01); *F02M 1/185* (2013.01)

USPC .......................................................... 261/34.1

(58) Field of Classification Search

CPC ......... F02M 17/02; F02M 17/04; F02M 1/02; F02M 1/08; F02M 1/10; F02M 1/16

See application file for complete search history.

(56) References Cited

U.S. PATENT DOCUMENTS

| | | | | |
|---|---|---|---|---|
| 6,945,520 | B2 * | 9/2005 | Ohgane et al. | 261/44.6 |
| 7,261,280 | B2 * | 8/2007 | Takano et al. | 261/44.6 |
| 7,475,871 | B2 * | 1/2009 | Terakado et al. | 261/44.6 |
| 7,913,659 | B2 * | 3/2011 | Maupin | 123/179.11 |
| 8,136,796 | B2 * | 3/2012 | Chen | 261/50.1 |
| 2006/0170120 | A1 * | 8/2006 | Takano et al. | 261/44.6 |
| 2008/0061454 | A1 * | 3/2008 | Braun | 261/35 |
| 2009/0314240 | A1 * | 12/2009 | Maupin | 123/179.11 |
| 2010/0308479 | A1 * | 12/2010 | Chen | 261/63 |
| 2012/0318249 | A1 * | 12/2012 | Warfel et al. | 123/704 |

FOREIGN PATENT DOCUMENTS

| | | |
|---|---|---|
| CN | 200520095240.0 | 4/2006 |
| CN | 200610008981.X | 11/2006 |

* cited by examiner

*Primary Examiner* — Amber Orlando

(74) *Attorney, Agent, or Firm* — Caesar, Rivise, Bernstein, Cohen & Pokotilow, Ltd.

(57) ABSTRACT

A carburetor improves the starting performance of an engine. The carburetor includes a main body, a pump oil ball and a fuel-air mixing channel which extends through the main body. The pump oil ball is mounted to an air strangler spindle via a spiral groove. When the pump oil ball is pressed, the air strangler spindle is driven to rotate by the spiral groove and thus to control the air strangler spindle between the fully open state and the fully closed state. The carburetor dramatically improves the starting performance of the engine.

21 Claims, 13 Drawing Sheets

A-A

A-A

SIMPLE STARTUP CARBURETOR

TECHNICAL FIELD

The embodiments described herein relate to a simple startup carburetor, and more specifically to a carburetor that improves the engine startup performance.

BACKGROUND OF THE INVENTION

The continuing improvement of society and economic booming have provided a good platform for further developing of the gasoline engine industry. The gasoline engine auxiliary industry developed rapidly because of the development of the gasoline engine industry. As one of the gasoline engine auxiliary industries the carburetor industry developed rapidly. Carburetor is an apparatus in a petrol engine which mixes fuel and air in order to make the petrol engine operate regularly. In the engine start-up process, reducing the amount of air by closing the intake passage, so that the density of mixture gas has increased and thus make the engine start. However, the existing carburetor has certain drawbacks. Before the existing carburetor leaves manufacturing, based on its technique which has marched with engine, to adjust the amount of petrol supplying of main oil installations and idle oil installations.

Therefore, when the carburetor supplies petrol to the engine, the proportion of the mixture of air and fuel reaches to the optimal and thus makes the engine work more efficient and saves energy. In order to improve the start-up possibility and reduce the times of start-up, it should remain in a high density of air-fuel mixture in the carburetor. After the start-up process finishes, when the carburetor works in a normal condition, it should reach the optimal condition in order to extend the working life and reduce air pollution. However, the existing carburetor cannot fulfill it.

The engine starting apparatus of the rotary valve carburetor which drives the cam interface connectors through the actuating lever and rotates the throttle lever, axially elevates the carburetor with a predetermined angle and axial distance, as disclosed in China Patent No. CN200610008981.X. The engine starting apparatus provided fuel-air mixture that is controllable and concentrated for the engine of starting up, but the carburetor in the said engine starting apparatus requires cam interface shifter, which drives the throttle lever to move in the axial direction. Such carburetor, which demands complex structural design, increases the axial dimension and hinders the application by itself.

CN 200520095240.0 disclosed a carburetor with low fuel consumption and low temperatures easy startup motorcycle carburetor. The thermostatic valve assembly is mounted on the cylinder of the motorcycle. The carburetor installed supplementary air holes parallel allocated with the air hole on the idling channel, and installed supplementary air holes parallel allocated with the air hole on the main channel based on the existing motorcycle. This carburetor improved the low temperature start-up performance of the engine to a certain degree. However, the internal structure and external structure of the carburetor are complex due to installed supplementary air holes parallel allocated with the air hole on the idling channel, and installed supplementary air holes parallel allocated with the air hole on the main channel based on the existing motorcycle, so that the cost of the design, manufacture and maintenance of the carburetor increased and thus the utilization of this carburetor is limited.

As the carburetor of the prior art cannot solve the said drawback, a carburetor which improves the ratio of fuel to air and keeps preferably fuel and air mixing ratio as to play a best performance of the engine and prolong engine life is urgently needed.

SUMMARY OF THE INVENTION

The purpose of the present invention is to provide a simple startup carburetor which rises the ratio of fuel in the fuel-air mixture in the process of startup and keep preferably fuel and air mixing ratio as to play a best performance of the engine and increase the engine's life.

In order to achieve the above purposes, the technical solution of the present invention provides for:

A simple startup carburetor comprising a main body, a pump oil ball and a fuel-air mixing channel which is extended through the main body part, wherein the said pump oil ball is mounted to the air strangler spindle via a spiral groove. When the pump oil ball is pressing, the air strangler spindle is driven to rotating by the spiral groove and thus controls the air strangler spindle between fully open and fully closed. Preferably, the spiral shaped groove is provided in the shell of said spiral groove. A spiral groove pin is provided on the air strangler spindle. The said spiral groove pin is extended through the spiral groove and thus locates the spiral groove on the air strangle spindle.

Preferably, the said carburetor has a thermostat platen. A paraffin thermostat is connected to the said thermostat platen which is fixed on the lower cover of the said carburetor.

Preferably, the said air strangler spindle is embedded through the main body of the carburetor. A throttle valve linkage arm is fixed in the end of said air strangler spindle which extends to the external of the main body.

Preferably, a return spring set on the end of the air strangler spindle, and said end of the air strangler spindle is located between said throttle valve linkage arm and the main body.

Preferably, the return spring of the pump oil ball set on between the said spiral groove and the said main body, the said return spring is used together with the return spring of the air strangler spindle to balance with the force of the air strangler spindle in the axial direction.

Preferably, integrally molded embossing is set on the end of said spiral groove.

Preferably, the air strangler valve linkage arm is fixed on the said main body.

Preferably, said air strangler valve linkage arm rotates clockwise while the said throttle valve linkage arm rotates counterclockwise, thus the linkage of the carburetor works.

Preferably, said paraffin temperature controller comprises a cooper seat, paraffin, the diaphragm, the housing, the liquid media, the plunger, the top pole, the vent and the return spring.

Preferably, said liquid media is a mixture of $MoS_2$ powder and grease.

Preferably, said carburetor comprises an upper cover and a lower cover.

Preferably, the choke and the throttle are set in said fuel-air mixing channel which has a throat and a mixing chamber.

Preferably, the said main body formed roughly in cylindrical shape and lateral extended through the cavity of the fuel-air mixing channel, and thus the throttle shaft can be rotating mounted, so that the throttle can be adjusted between fully open and fully close.

Preferably, locating a pin set in between said integrally molded embossing and said main body, the said locating pin functions to restrict the rotating of the pump oil ball, and thus allows the pump oil ball to move along an axis.

Preferably, the air strangler valve linkage arm comprises a circular part and an engagement part.

Preferably, said engagement part comprises a circular groove and embossing.

Preferably, said circular groove is arc-shaped, within the arc-shaped circular groove, a joint pin is fixedly mounted on the housing of the main body.

Preferably, said air strangle spindle further comprises: a milling flat, and when the pump oil ball is impressed, the milling flat is communicated with the aperture which leads to the air. The said air strangler spindle also comprises a cylindrical surface of the air strangler spindle so that blocks the aperture which connected with engine impulse aperture. Preferably, while press the said pump oil ball, the milling flat into a position that communicates with the measuring room and the impulse chamber which is respectively located in the lower and upper part of the main body instead of communicating with the atmosphere.

Preferably, locating the pin set in between the spiral groove and the main body.

Compared with the prior art, the present invention adopts a linkage gear and a paraffin thermostat. While the linkage gear is linked, the milling flat of the air strangler spindle connected with the impulse chamber, leads the impulse force into the metering chamber, so that the impulse force pushed the fuel in the metering chamber to the throat of the carburetor; therefore, even in the low temperature, the property of a fuel and an air mixture is still high and thus improves the engine performance. When the carburetor works in the normal condition, the property of a fuel and an air mixture drops down to the optimal which based on the engine's technique feature. On the other hand, when engine start-up in high temperature condition, although the linkage gear is linked and the impulse force is leaded to the metering chamber, the pole of the paraffin thermostat is opened and the air hole is linked with air, so that the impulse force can only push less fuel out. Hence, the amount of fuel will be proper amount for engine starts up in high temperature condition. Therefore, the present invention improves engine's work rate simultaneously reducing the fuel consumption, and further increases the using life.

BRIEF DESCRIPTION OF THE DRAWINGS

This is the description of a specific embodiment based of the present invention. Features and advantages of the present invention will become apparent on the following description in detail.

FIG. 13 is the cutaway view along the line A-A of the FIG. 10, showing the state of the paraffin thermostat turned on;

DESCRIPTION OF A SPECIFIC EMBODIMENT

Following description is exemplary only embodiment but is not intended to limit the present disclosure, application, or uses essentially. It should be understood that, in all the drawings, corresponding numbers indicate the same or corresponding parts and features.

Figure 1:
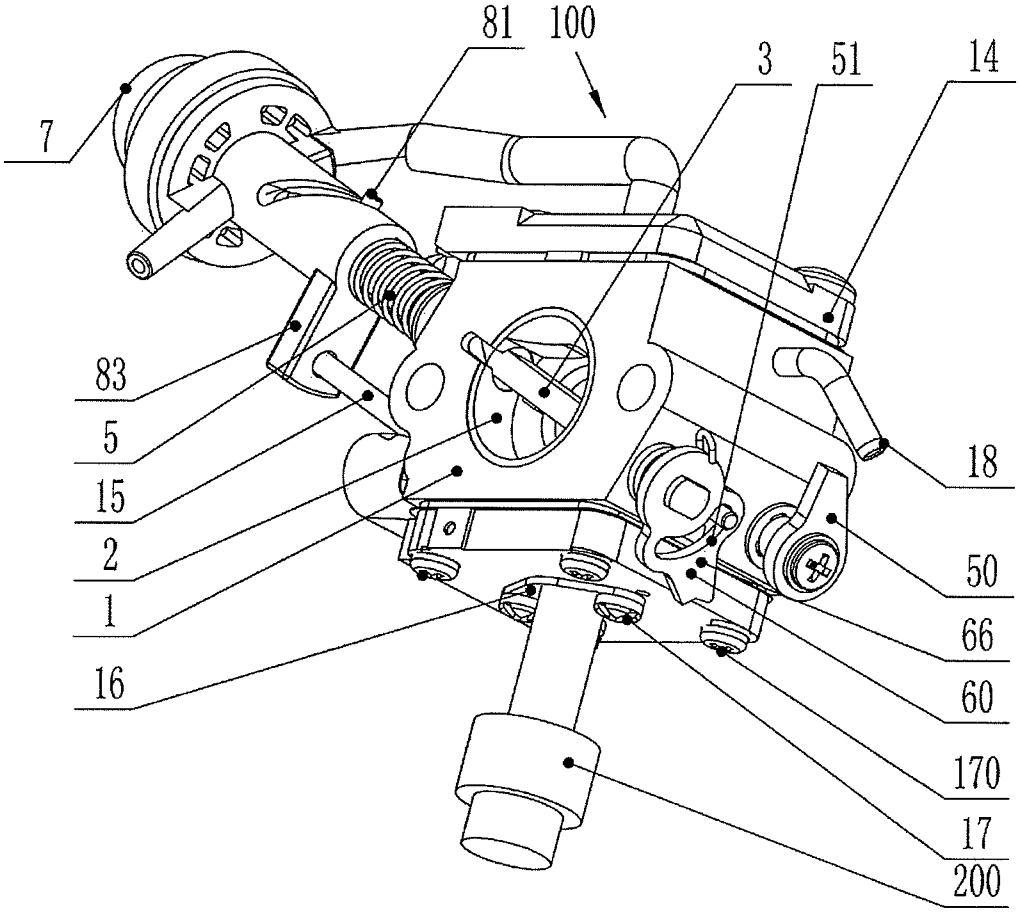
FIG. 1 is a 3D isometric drawing of the present invention carburetor.

Now referring to the drawings, FIG. 1 describes an embodiment according to the overall structure of the simple startup carburetor 100 of the present invention. As shown on the FIG. 1 that the carburetor 100 has a main body 1, an upper cover 14, a lower cover 19 and a fuel-air mixing channel 2 which extends through the said main body. The fuel-air mixing channel 2 is a cylindrical cavity which is smaller in the middle and is bigger in the each end. The throttle 11 is set within the fuel-air mixing channel 2 which also has a throat 104 and a mixing chamber 101 (reference to the FIG. 11). The said main body has roughly cylindrical shaped crosswise extension through the mixing channel 2, and rotatable mounts the throttle shaft 12 so that the throttle 11 can be switched in between the fully open state and the fully close state, and thus controls the extent of connection of fuel and air mixing channel. Thermostat plate 16 fixed on the lower end surface of the lower cover 19 by connecting member such as screw 17. Paraffin thermostat 200 fixed on the lower cover 19 of the carburetor by thermostat plate 16 and further mounted on the main body 1 of the carburetor by screw 170. On one side of the main body 1 provides an inlet pipe 18, which obtains fuel from the fuel tank of the engine.

Figure 2:
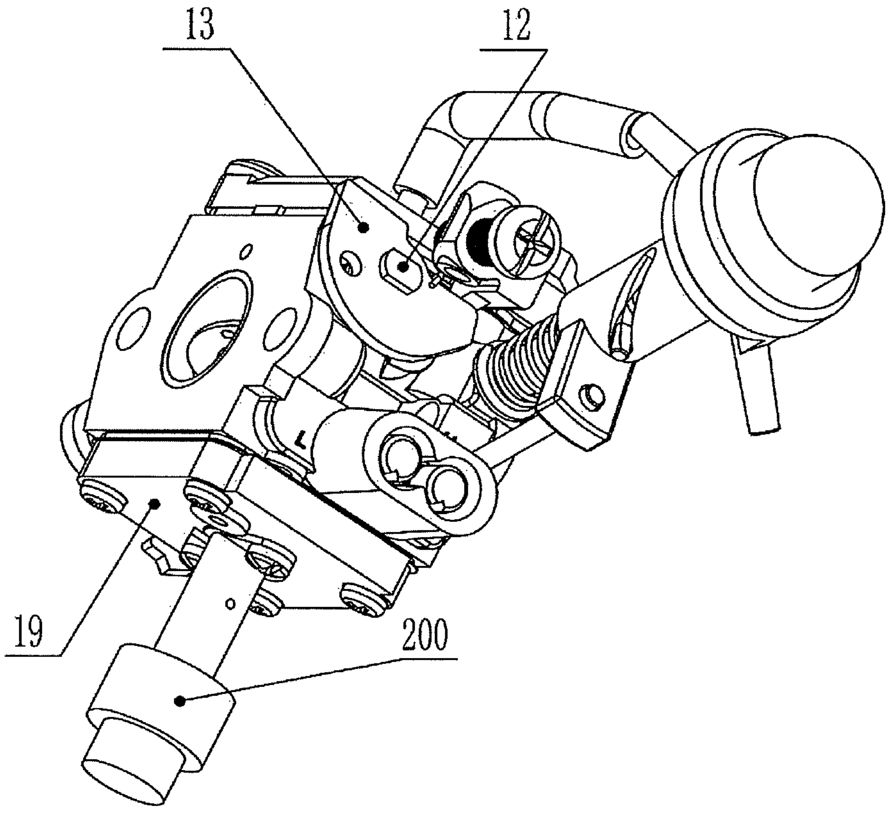
FIG. 2 is another 3D isometric drawing of the present invention carburetor.
Figure 7:
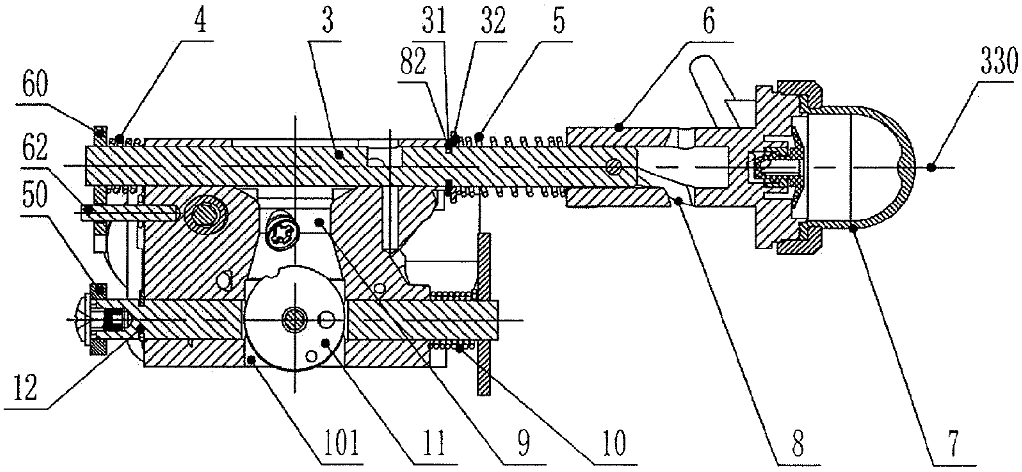
FIG. 7 is the cross-sectional view of the carburetor of FIG. 1.

Further according to the FIG. 1, FIG. 2 and FIG. 7, the pump oil ball 7 is hemispherical elastic product with cavity and fixed on the spiral groove body 6. The said spiral groove body 6 is a hollow tubular member. One side of the spiral groove body provides the spiral groove. The spiral groove body 6 is pivotally mounted on air strangler spindle 3 and moved axially when pump oil ball is pressed. Spiral groove pin 81 is provided on the air strangler spindle 3. The said spiral groove pin 81 extends upward through spiral groove 8, and thus properly mounted the spiral groove body 6 on the air strangler spindle 3. A strangler spindle 3 extends through main body 1 of the carburetor and the part of air strangle spindle where locates outside of the main body connect with throttle valve linkage arm 60 by using such as riveting. Air strangler spindle return spring 4 sets on the end of the air strangler spindle 3 where between throttle valve linkage arm 60 and main body 1. The said return spring 4 is a torsion spring or common spring. The said return spring 4 is used together with return spring 5 of pump oil ball to balance the force on air strangler spindle 3 in the axial direction. A groove 82 is set on retaining ring 31, which the said groove 82 is located in the middle of the air strangler spindle 3, so that the air strangler spindle 3 which is set inside of the main body 1 would not move along the shaft axis 330, when pump oil ball is pressed. Gasket 32 is set outside of the retaining ring 31, so that the return spring 5 of pump oil ball is movable set between the gasket 32 and spiral groove body 6. Integrally molded embossing 83 is provided on the spiral groove, locating pin 15 is set between said integrally molded embossing 83 and said main body 1, and thus restricting the rotation of pump oil ball but allow to move upward and downward along the shaft axis 330. While press the pump oil ball, spiral groove pin 81 moves inside of the spiral groove 8 and leads to spiral groove 6 rotating and thus drives the air strangler spindle 3 rotating.

Figure 6:
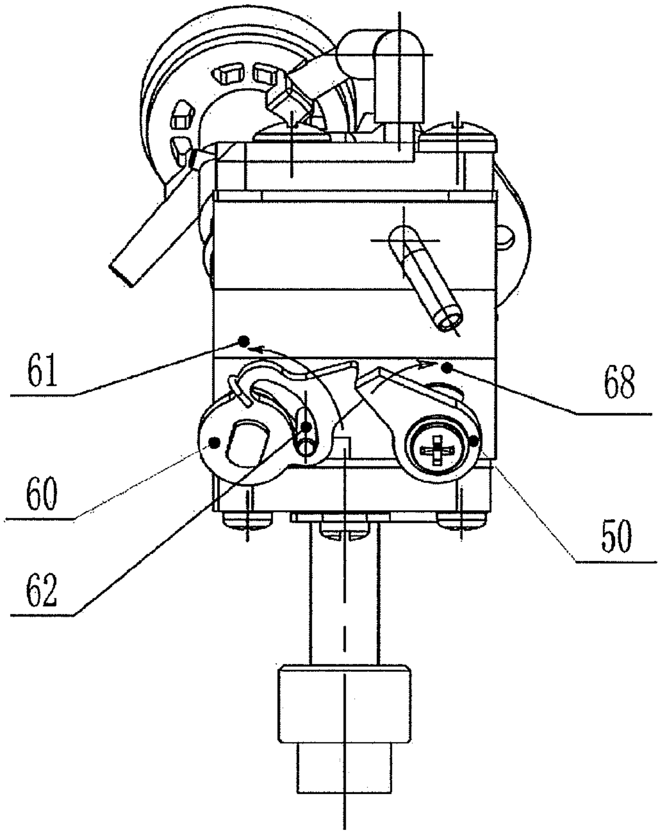
FIG. 6 is the lateral view of the present invention carburetor in which the pump oil ball is pressed and the linkage is worked of the FIG. 5.

The linkage of the carburetor is shown on the FIG. 1, FIG. 4, FIG. 6 and FIG. 7. The said linkage comprises pump oil ball 7, spiral groove 6, return spring 5 of pump oil ball, air strangler spindle 3, return spring 4 of air strangler spindle, throttle valve linkage arm 60, air strangler valve linkage arm 50, throttle shaft 12, return spring 10 of throttle and accelerator cable holder 13. Accelerator cable holder 13 which riveted on throttle shaft 14, rotating mounted on the outside surface of main body 1. Throttle valve linkage arm 60 comprising circular part 64 with hole which is riveted on the air strangler spindle 3 and engagement part 65. The said engagement part 65 with annular hole 51 and preinjection 66, said annular hole 51 is arc shaped, the inside of said annular hole contains joint pin 62 which mounted on the main body 1. Air strangler spindle 3 rotating drives the annular hole 51 sliding along the joint pin 62 when pressing pump oil ball 7, so that the top of preinjection 66 contacts with the air strangler valve linkage arm. Referring to FIG. 6, air strangler valve linkage arm 50 pivotally mounted to main body 1 by screw, said air strangler valve linkage arm rotates clockwise as demonstrated in sign 68. And the throttle valve linkage arm 60 rotates counterclockwise as demonstrated in sign 61.

Figure 3:
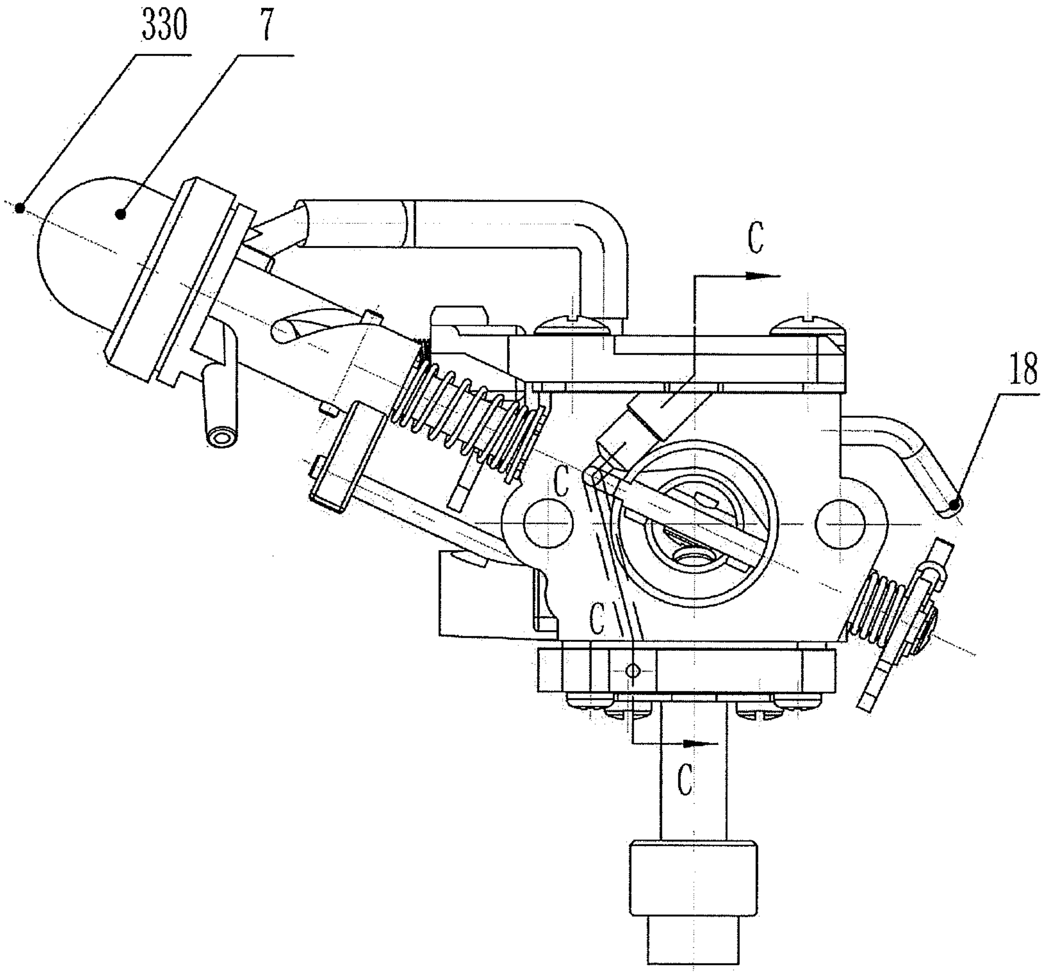
FIG. 3 is the main view of the present invention carburetor, showing a state when the pump oil ball non-pressed.
Figure 4:
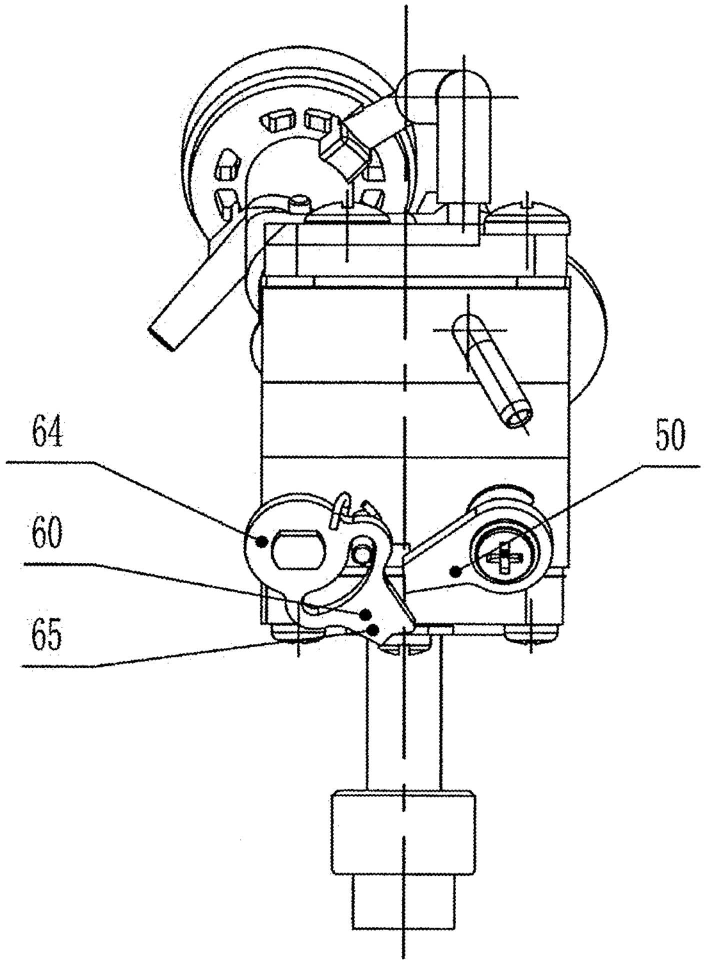
FIG. 4 is the lateral view of the present invention carburetor in which the pump oil ball is non-pressed and the linkage is not worked of the FIG. 3.
Figure 8:
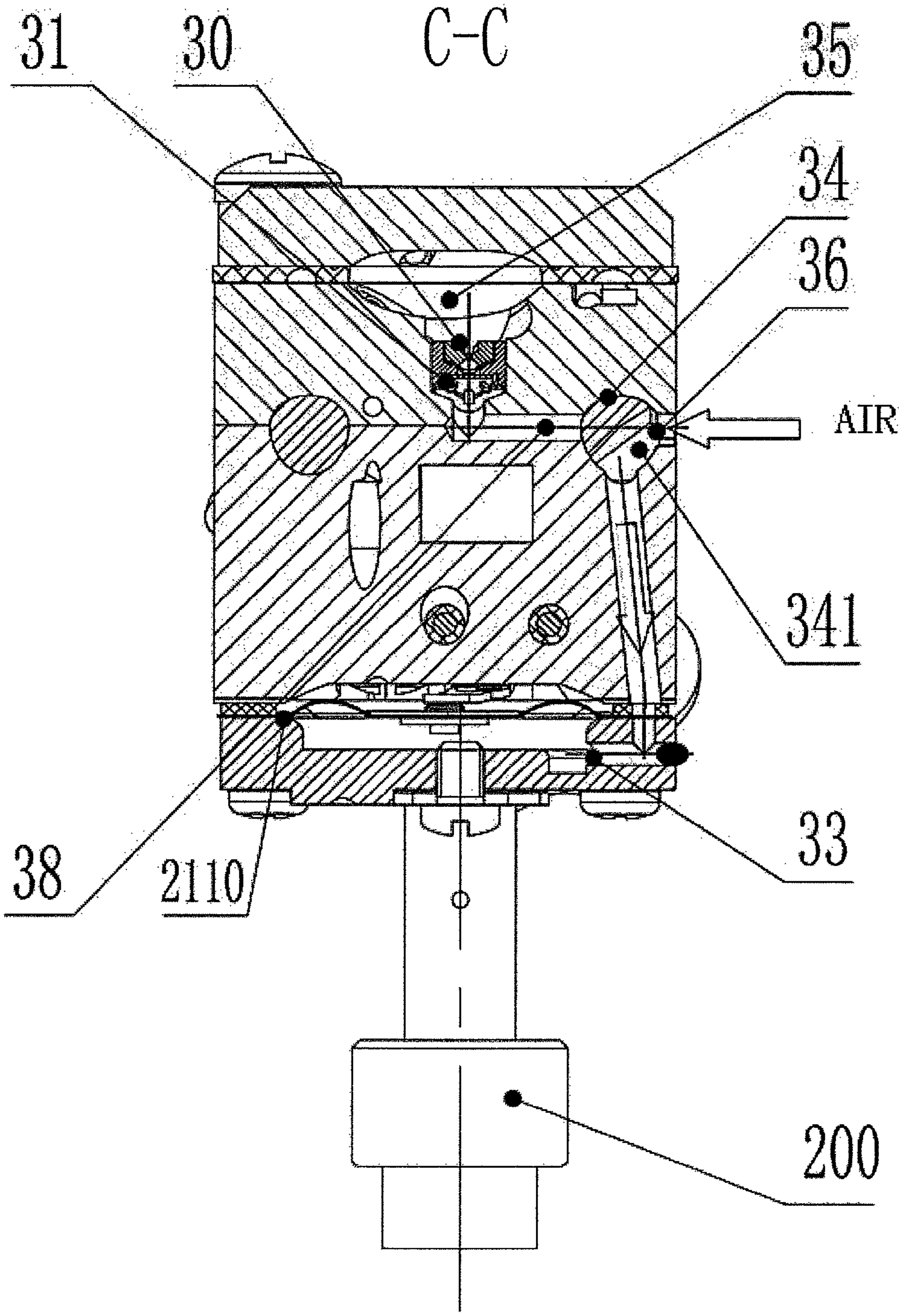
FIG. 8 is the cutaway view along the line C-C of the FIG. 3, showing the state of that milling plate on the air strangler spindle communicates with the air.

According to FIG. 3 to FIG. 9 further, press the pump oil ball 7 with hands before start-up the engine. FIG. 3 shows the state when the pump oil ball 7 is unpressed. In this situation shown in the FIG. 3, air strangler spindle 3 is fully opened, and throttle 11 is fully closed, the linkage is non-operating as in the FIG. 4. In the exemplary embodiment of the present invention, referring specifically to FIG. 8, as air strangler spindle is fully opened, the milling flat 341 of said air strangler spindle 3 communicates with vent 36, and the cylindrical surface 34 blocks the hole that communicates with the engine impulse hole 38. The metering chamber 33 which located in the lower part of the main body 1 communicates with the atmosphere instead of communicating with the impulse chamber 35 of the carburetor. At this time the pressure of metering chamber 33 equals to the atmospheric pressure, the pressure pulse from engine crankcase cannot be received. As shown in FIG. 8, the check valve 31 is installed between the impulse chamber 35 and the impulse hole 38. Such check valve is also provided on main body 1 and the purpose is to block the pulse in inhalation process during the blow-inhalation procedure, so that only blow impulse can enter into metering chamber. There is an impulse metering hole 30, which can adjust according to the need, above the check valve. Consequently, the impulse force entering the metering chamber 33 can be adjusted.

Figure 5:
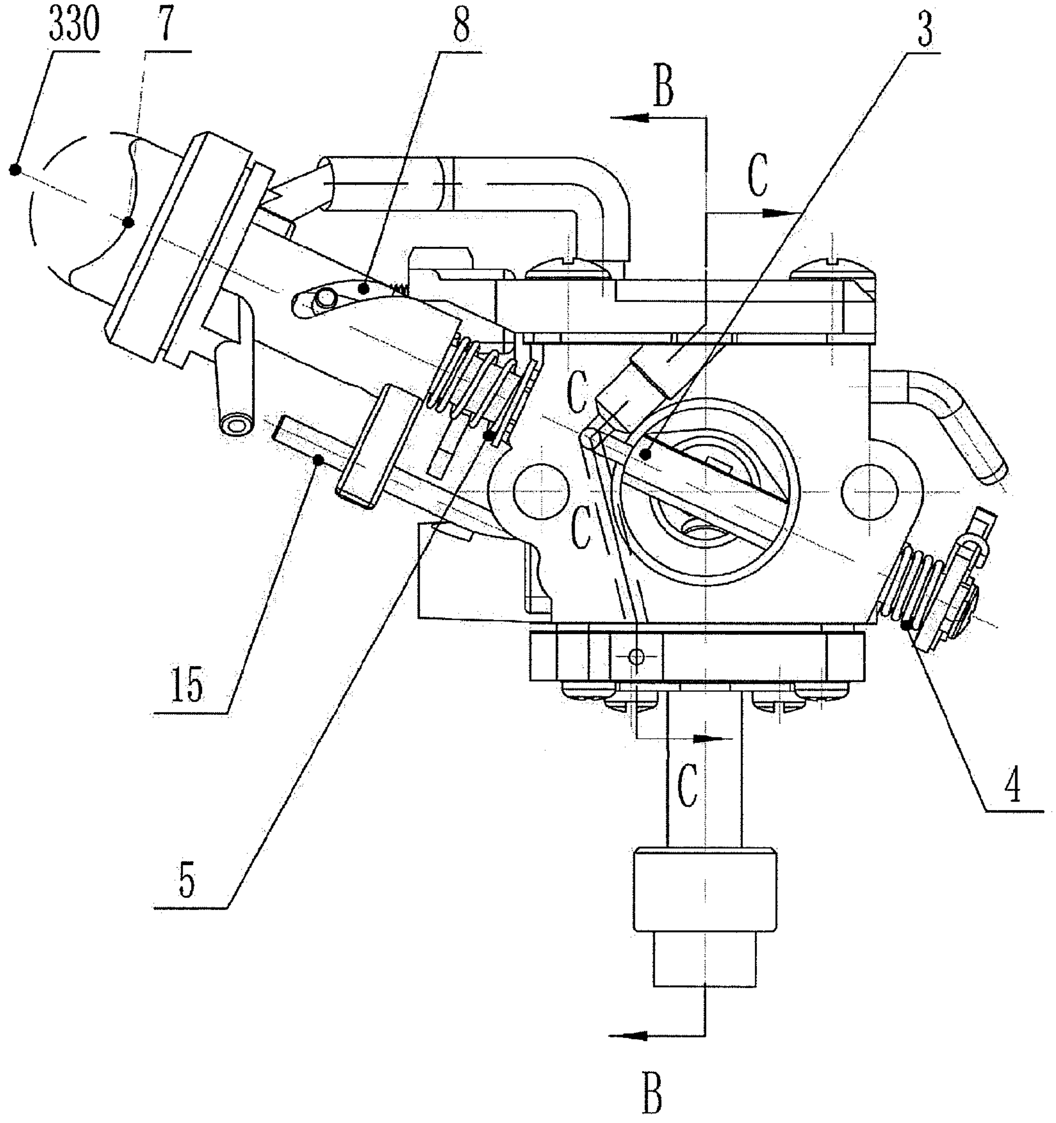
FIG. 5 is the main view of the present invention carburetor, showing a state when the pump oil ball pressed.

While pressing the pump oil ball 7, demonstrated in FIG. 5, pump oil ball cannot rotate around shaft axis 330 but moves along said shaft axis due to the locating pin 15. As the spiral groove pin 81 is fixed on the air strangler spindle 3 and only moved inside of the spiral groove 8 of the spiral groove body 6, the movement of the spiral groove pin 81 drives the spiral groove 8 and air strangler spindle 3 to movement. In the preferred embodiment, air strangler spindle 3 rotates for 75° when presses the pump oil ball 7. The rotation of the air strangler spindle 3 drives the throttle valve linkage arm 60 which riveted on air strangler spindle 3 to rotate along counterclockwise direction shown in FIG. 6. At this time the annular hole 51 of the engagement part 65 of throttle valve linkage arm 60 moves along joint pin 52 which fixed on the main body 1, thus the throttle valve linkage arm 60 rotates counterclockwise. In this case, the engagement part 65 pushes the air strangler valve linkage arm 50 to rotate clockwise shown as direction 68 in FIG. 6, and the linkage worked.

While releasing the pump oil ball 7, the pump oil ball 7 returns back to the initial position due to return the spring 5 of the pump oil ball 7. When the linkage works, the air strangler spindle 3 rotates for 75°, and the milling flat 341 communicates with the impulse hole 38 and metering the chamber 33, and the cylindrical surface 34 of the air strangler spindle 3 blocks the vent 36 shown in FIG. 9. The pressure impulse 37 from crankcase of the engine enters into the metering chamber 33 through the impulse chamber 35, impulse metering hole 30, check valve 31 and impulse hole 38. The said pressure impulse 37 pushes the metering diaphragm 2110 by which the fuel in the metering chamber 33 is extruded through the main nozzle 20 of the carburetor, so as to enrich the gas mixture and beneficial to the start up of the engine.

Figure 11:
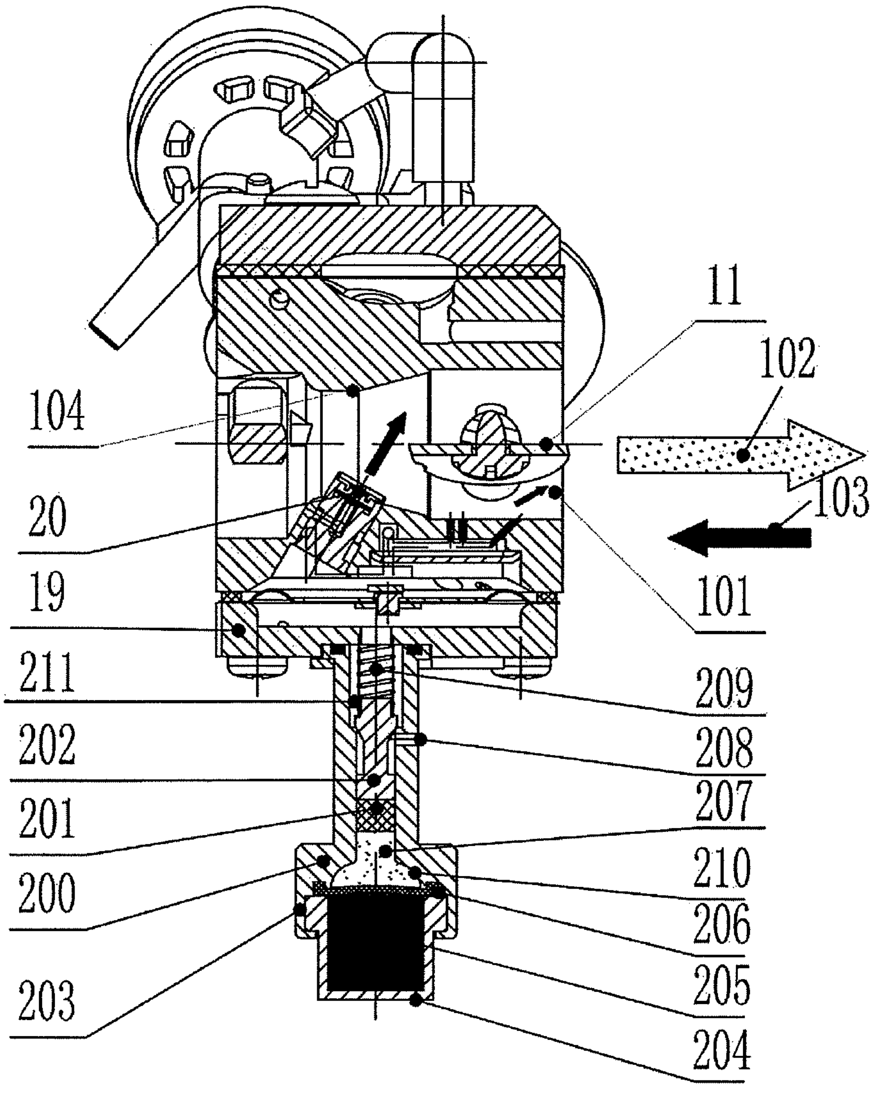
FIG. 11 is the cutaway view along the line B-B of the FIG. 5.
Figure 12:
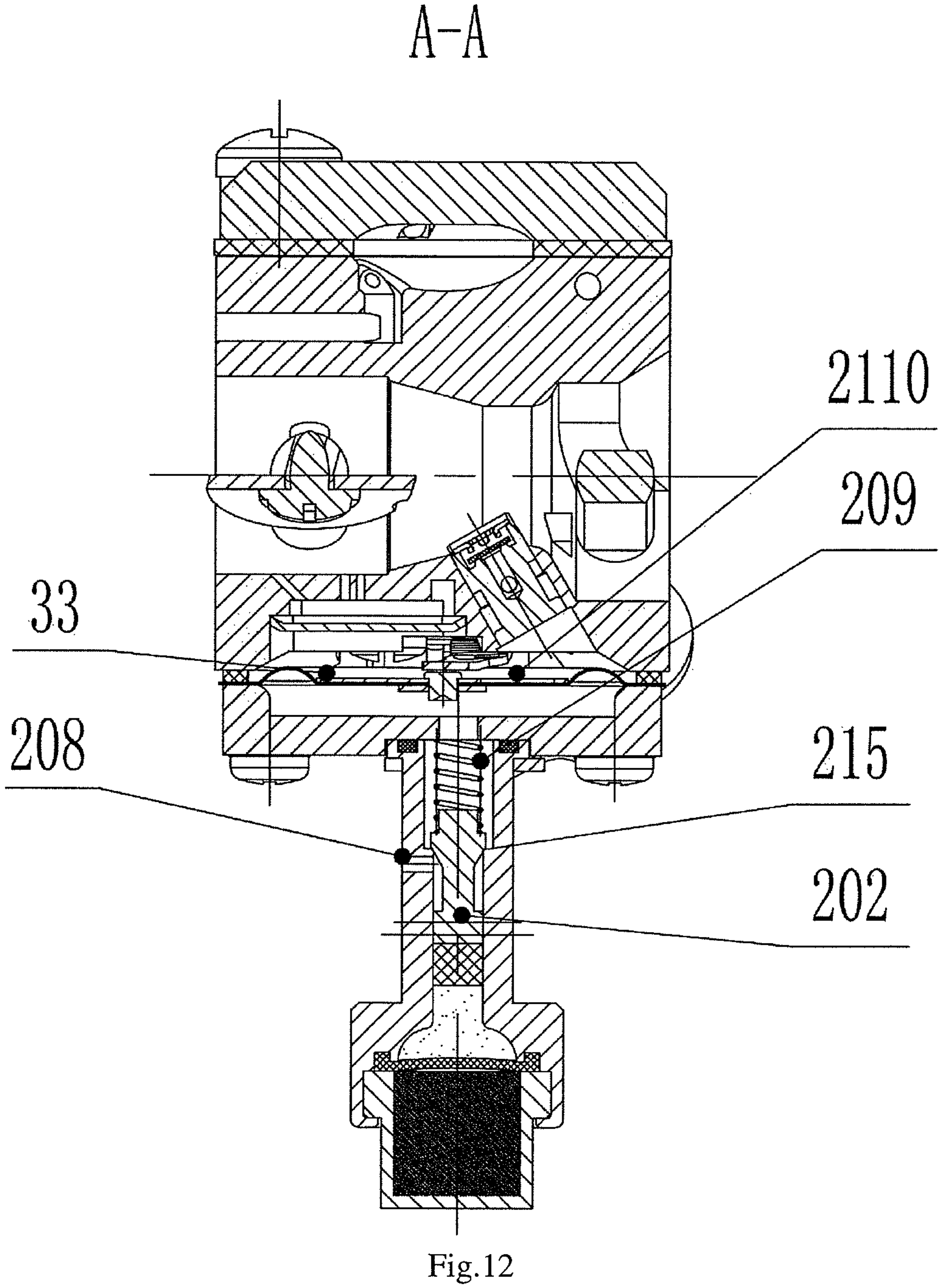
FIG. 12 is the cutaway view along the line A-A of the FIG. 10, showing the state of the paraffin thermostat turned off.
Figure 13:
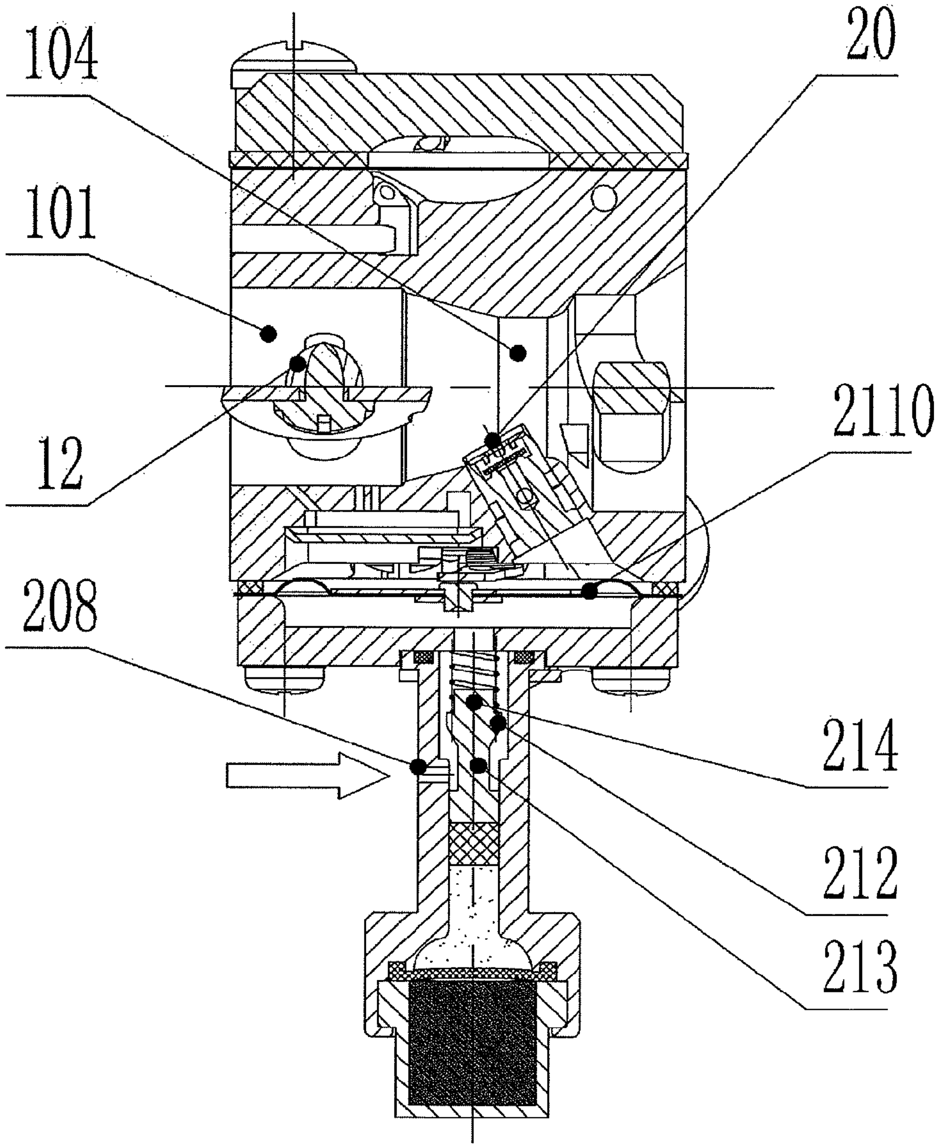

According to FIG. 10 to FIG. 13, paraffin thermostat 200 in the present invention will be described in detail. As shown in FIG. 11, the present invention of the paraffin thermostat 200 has the cooper seat 204, the paraffin 205, the diaphragm 206, the housing 203, the liquid media 207, the plunger 201, the top pole 202, the vent 208 and the return spring 209. The section of the cooper seat 204, in which the paraffin 205 is placed, is in rectangle shape with a ladder. The housing 203 has a cavity extended on lower part. The said housing 203 is connected with the cooper seat 204 by thread or rivet, so that the cooper seat 204 is fixed on the housing 203. The housing 203 has hollow cavity 211 and the liquid media chamber 210 which is located in lower part of the housing 203. The section of the liquid media chamber 210 is shaped flared horn for holding the liquid media 207. The liquid media 207 of the present invention is high density fluid-like substance and not easy to dry. In the exemplary embodiment, the liquid media 207 of the present invention is a mixture of $MoS_2$ powder and grease. Diaphragm 206 is set between liquid media 207 and paraffin 205. The plunger 201 which can slide along the hollow cavity 211 is set above the liquid media 207. The top pole 202 which can slide along the hollow cavity 211 is set in the said hollow cavity 211 which is located in the housing 203. The top pole 202 comprises elongate part 213, the inverted arrow-shaped protrusion 212 and the tail 214, and the radial diameter of elongate part 213 is smaller than the least radial diameter of the hollow cavity 211 so that the air from the vent 208 enters into the hollow cavity 211. While the outside temperature is less than 20°, inverted arrow-shaped protrusion 212 of the top pole 202 abuts against the shoulder seat 215 of the housing 203 through the pre-biasing force of the return spring 209, so that the channel is connecting with metering chamber 33 and the hollow cavity 211 is closed. One end of the return spring 209 is connected to the tail 214 of the top pole 202, and the other end of the return spring 209 is fixed in the lower cover 19, so that the said return spring 209 can be axially compressed with the movement of the top pole 202.

Now referring to FIGS. 10-13, further describes the working process of paraffin thermostat 200. The paraffin 205 that placed in the paraffin thermostat 200 works as a temperature sensor component. Utilizing the character of thermal expansion and contraction of paraffin 205, pushes the top pole 202, so that the inverted arrow-shaped protrusion 212 of the top pole 202 opens or closes the channel connecting with metering chamber 33 and the vent 208, thus controlling the fuel extruded through the main nozzle 20, which located in the metering chamber, is controlled when the engine is starting up. The top pole 202 of the paraffin thermostat 200 of present invention is closed when the temperature is lower than the first temperature threshold value, whereas the top pole 202 is open when the temperature is higher than the second temperature threshold value, specifically in FIG. 12 and FIG. 13. In the exemplary embodiment, the first temperature threshold value of the present invention is set for example 20°, while the second temperature threshold value is set for example 38°. The first and second temperature threshold value of the present invention can vary with each application of the engine, for example the first temperature threshold value can be set at any value between 18° to 25°, and the second temperature threshold value can be set to any value between 35° to 42°.

Figure 9:
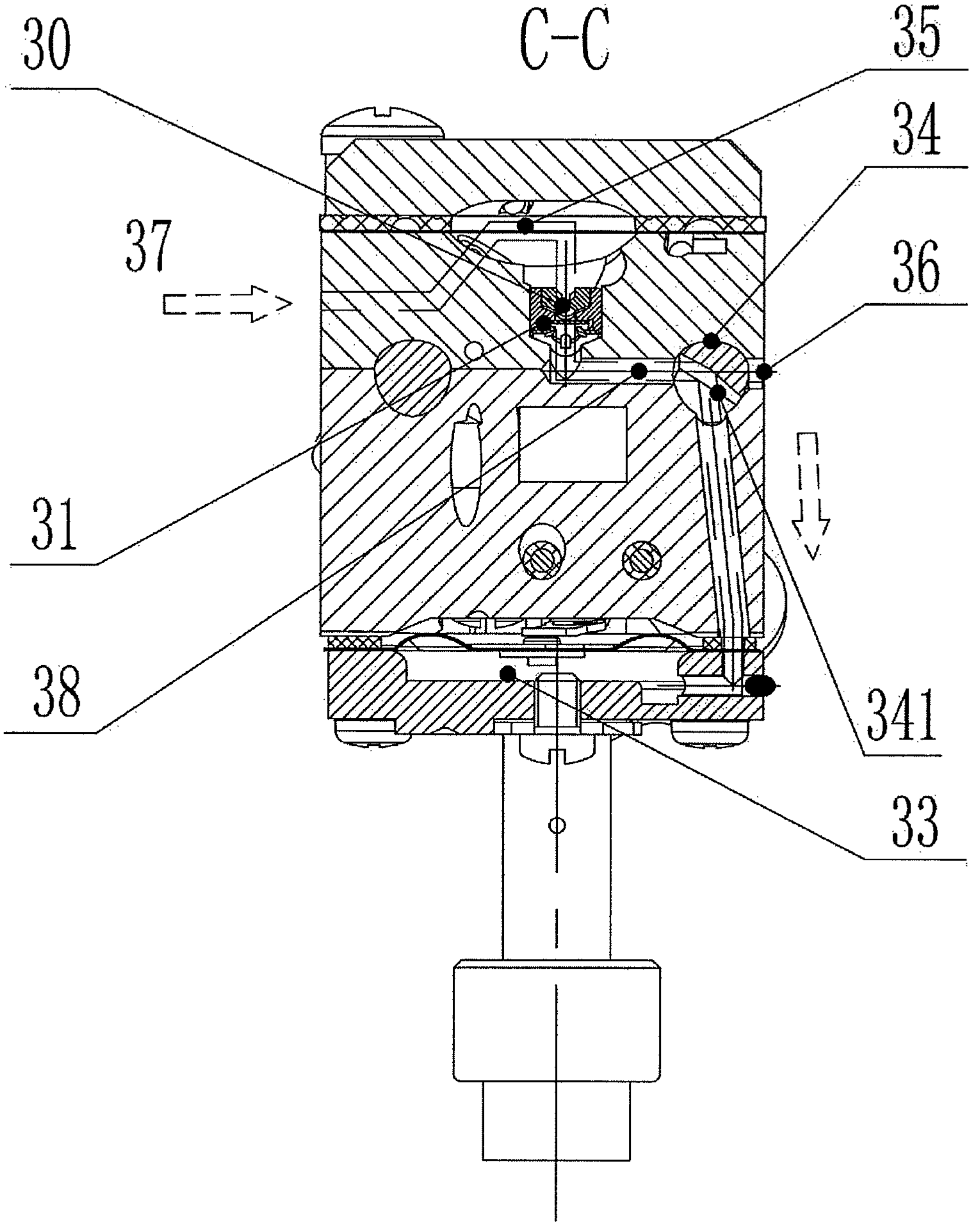
FIG. 9 is the cutaway view along the line C-C of the FIG. 5, showing the state of that milling plate on the air strangler spindle communicates with the metering chamber.
Figure 10:
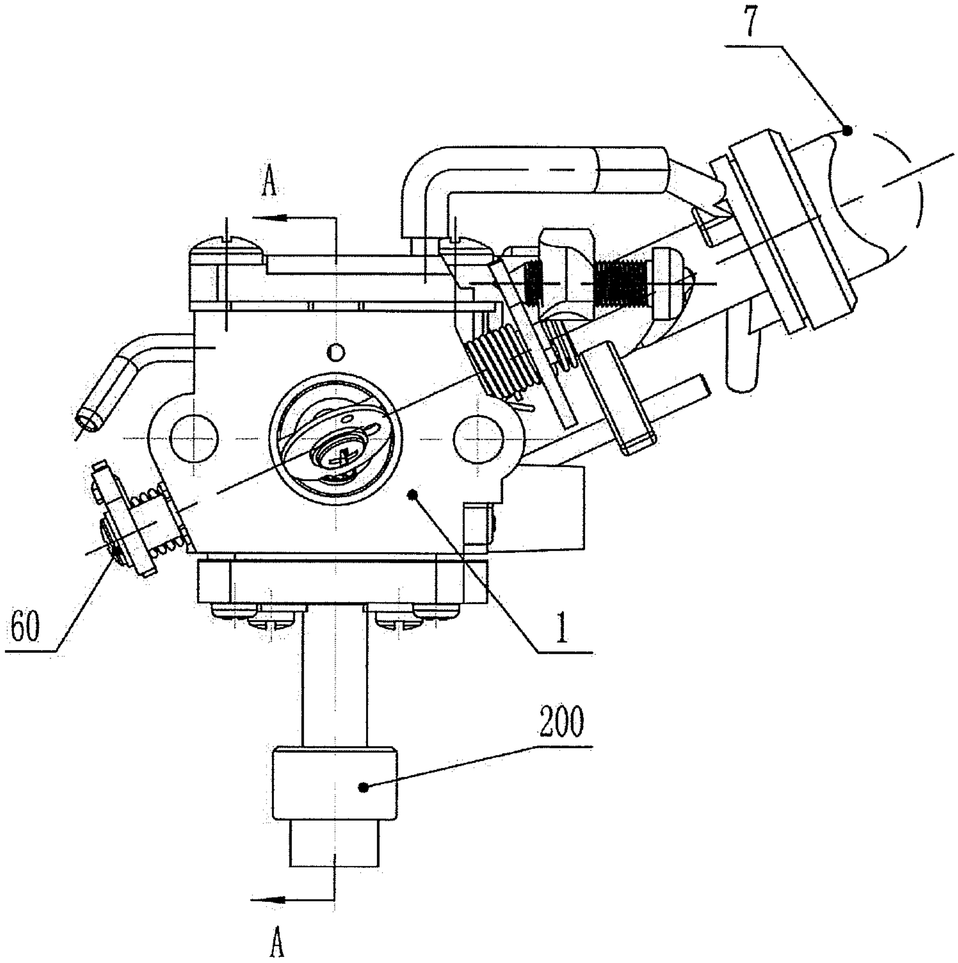
FIG. 10 is the rear view of the present invention of the carburetor.

When the engine is in a lower temperature, such as the temperature that 20° lower than the first temperature threshold value, the engine start up by pressing pump oil ball 7, and then the spiral groove 8 of the spiral groove body 6 drives the air strangler spindle 3 rotating. Then the throttle valve linkage arm 60 of the air strangler spindle 3 drives the air strangler valve linkage arm 50, and the linkages worked, while the milling flat 341 of the air strangler spindle 3 communicates with the pressure impulse 37 of the engine with the metering chamber 33 as shown in FIG. 9. After the pressure impulse 37 enters into the metering chamber 33, the pressure impulse 37 pushes the metering diaphragm 2110 which is located in the metering chamber 33. As the top pole 202 of the paraffin thermostat 200 is closed, the vent 208 isolated with the atmosphere, the fuel 103 from the metering chamber 33 is extruded through main nozzle 20 in the role of pressure impulse. The fuel extruded through said main nozzle 20 is enriched fuel-air mixture in the mixing chamber 101 and beneficial to the start up of engine.

When the engine starts up in a higher temperature, such as the temperature is higher than 38° higher which is set as the second temperature threshold value, the engine start up by squeezing pump oil ball 7, the spiral groove 8 also drives the air strangler spindle 3 rotating. Then the throttle valve linkage arm 60 at the end of the air strangler spindle 3 rotates counterclockwise, consequently, the air strangler valve linkage arm 50 rotates clockwise, and the linkages worked, as shown in FIG. 6. At the same time, the milling flat 341 of the air strangler spindle 3 communicates the pressure impulse 37 of the engine with the metering chamber 33. Paraffin thermostat 200 pushes the top pole 202 in the function of the paraffin 205, and the top pole overcomes the tension of the return spring 209, thus the inverted arrow-shaped protrusion 212 of the top pole apart from the shoulder seat 215 of the housing 203, and the top pole 202 opens so that the hollow cavity 211 contacts with the atmosphere through the vent 208. Even if the pressure impulse 37 that entering into the metering chamber 33 pushes the metering diaphragm 2110, the force of acting on the metering diaphragm 2110 is much smaller because the vent 208 is communicated with the atmosphere. Consequently, the metering diaphragm 2110 can't extrude more fuel through the main nozzle 20, less fuel is extruded out, shown as FIG. 13. In this case, the fuel extruded through the throat 104 is little; the density of the gas mixture is lower which meets the little fuel demand of starting up the engine in a high temperature. Thus meets the demand of starting up the engine in a high temperature.

Figure 14:
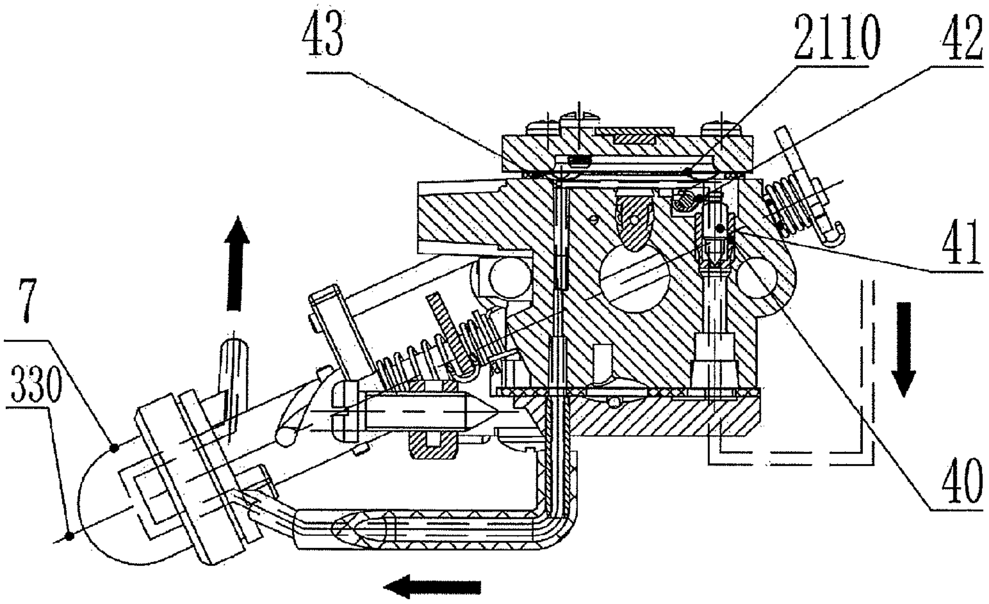
FIG. 14 is the circuit diagram of needle valve system in the main housing porting of the FIG. 1.

Finally, according to the FIG. 14, shows the circuit diagram of needle valve system in the main housing porting of the FIG. 1. The said needle valve system comprises the needle valve seat 40, needle valve 41, the needle valve rocker arm 42, metering spring (not shown in the Fig.), metering diaphragm 2110, and sealing paper pad 43. Squeezed the pump oil ball 7 before start-up the carburetor, there is vacuum (suction force) in the pump oil ball 7, then fuel is sucked out from oiler and entered the inlet pipe 18 of the carburetor. The fuel enters into the inlet pipe 18 and the upper cover 14, and then enters into the oil line of the main body 1 through the inlet oil line of the upper cover 14. The fuel thus enters into the needle valve system of the carburetor shown in FIG. 14. While entering into the needle valve system, the fuel enters into the metering chamber through needle valve seat 40 and needle valve 41. A part fuel of the metering chamber 33 enters into the pump oil ball 7, the remaining fuel, part of which stays in the metering chamber for the running of engine, returns to the oiler from the export of the pump oil ball 7. Because of the role of the metering spring, the needle valve 41 is closed when the amount of fuel reaches a certain degree in the metering chamber 33 of the carburetor. So that excess fuel cannot enter into the metering chamber 33. Conversely, the fuel in the metering chamber 33 is sucked out through the main nozzles 20 by the engine (shown in FIG. 11). When the fuel least than a certain level, in the role of engine vacuum, the metering diaphragm 2110 drives the needle valve rocker arm 42, and the needle valve rocker arm 42 again drives the needle valve 41 to open, the new fuel enters into the metering chamber, Although the drawings have described the present invention in detail, it should only to be understood as the explanation of the embodiments and does not limit the present invention. The protection range of the present invention should rely on the claims and could include the different types of the modification, equivalent arrangement and variation without apart from the scope and sprit of the present invention.

What is claimed is:

1. A simple startup carburetor comprising a main body, a pump oil ball and a fuel-air mixing channel which extends through the main body, wherein the said pump oil ball is mounted to an air strangler spindle via a spiral groove, when the pump oil ball is pressed, the air strangler spindle is driven to rotate by the spiral groove and thus to control the air strangler spindle between a fully open state and a fully closed state, and the simple startup carburetor installs a temperature controller platen, a paraffin temperature controller is installed on a lower cover of the carburetor by the temperature controller platen, and is fixed on the main body of the carburetor by at least one screw.

2. A simple startup carburetor comprising a main body, a pump oil ball and a fuel-air mixing channel which extends through the main body, wherein the said pump oil ball is mounted to an air strangler spindle via a spiral groove, when the pump oil ball is pressed, the air strangler spindle is driven to rotate by the spiral groove and thus to control the air strangler spindle between a fully open state and a fully closed state, and the spiral groove is provided in a body of the spiral groove, a spiral groove pin is provided on the air strangler spindle, the spiral groove pin extends through the spiral groove and thus locates the spiral groove on the air strangler spindle.

3. The carburetor of claim 1, wherein the said air strangler spindle extends through the main body, the said air strangler spindle is connected to a throttle valve linkage arm which is set on an outside of the main body.

4. The carburetor of claim 3, wherein a return spring is set on the said air strangler spindle between the main body and the throttle valve linkage arm.

5. The carburetor of claim 2, wherein a pump oil ball return spring is set between said spiral groove and said main body, the said pump oil ball return spring is functioned together with a return spring of the air strangler spindle to balance with the upward force of the air strangler spindle along an axis.

6. The carburetor of claim 2, wherein the said spiral groove has an integrally molded embossing.

7. The carburetor of claim 3, wherein an air strangler valve linkage arm is installed on the main body.

8. The carburetor of claim 7, wherein the said air strangler valve linkage arm rotates clockwise while the said throttle valve linkage arm rotates counterclockwise, so that a linkage mechanism of the said carburetor reminds in a linkage condition.

9. The carburetor of claim 3, wherein the paraffin temperature controller has a cooper seat, a paraffin, a diaphragm, a main body, a liquid media, a plunger, a top pole, an air vent and a return spring.

10. The carburetor of claim 9, wherein the said liquid media is a mixture of a Molybdenum disulfide ($MoS_2$) powder and a grease.

11. The carburetor of claim 1, wherein the said-carburetor also has an upper cover.

12. The carburetor of claim 1, wherein an air throttle is set in the said fuel-air mixing channel, which has a throat and a mixing chamber.

13. The carburetor of claim 1, wherein the said main body is roughly formed in a cylindrical shape and lateral extended through a cavity of the fuel-air mixing channel, and thus a throttle shaft can be rotatably mounted, so that a throttle can be adjusted between the fully open state and the fully closed state.

14. The carburetor of claim 6, wherein a locating pin is set between the said integrally molded embossing and the said main body, the said locating pin functions to restrict the rotating of the pump oil ball, and thus allows the pump oil ball moving along an axis.

15. The carburetor of claim 3, wherein the said air strangler valve linkage arm has a circular part and an engagement part.

16. The carburetor of claim 15, wherein the said engagement part has a circular groove and an embossing.

17. The carburetor of claim 16, wherein the said circular groove has an arc-shaped, within an arc-shaped circular groove, a joint pin is fixedly mounted on a housing of the main body.

18. The carburetor of claim 1, wherein the said air strangle spindle also has a milling flat, when the pump oil ball is impressed, the milling flat is communicated with an aperture which leads to the air.

19. The carburetor of claim 1, wherein the said air strangler spindle also has a cylindrical surface of the air strangler spindle so that blocks an aperture which is connected with an engine impulse aperture.

20. The carburetor of claim 18, wherein when the said pump oil ball is pressed, a metering chamber located under the main body is connected with an impulse chamber of the carburetor through the milling flat, but is not connected with air.

21. A simple startup carburetor comprising a main body, a pump oil ball and a fuel-air mixing channel which extends through the main body, wherein the said pump oil ball is mounted to an air strangler spindle via a spiral groove, when the pump oil ball is pressed, the air strangler spindle is driven to rotate by the spiral groove and thus to control the air strangler spindle between a fully open state and a fully closed state, and a locating pin is set in between the spiral groove and the main body.

* * * * *